Feb. 20, 1934.  F. WINKLER  1,947,960

VEHICLE WHEEL HUB

Filed July 28, 1932  2 Sheets-Sheet 1

Inventor

Franz Winkler

Patented Feb. 20, 1934

1,947,960

UNITED STATES PATENT OFFICE 1,947,960

VEHICLE WHEEL HUB

Franz Winkler, Schweinfurt, Germany

Application July 28, 1932, Serial No. 625,323, and in Germany July 29, 1931

3 Claims. (Cl. 208—101)

The invention relates to vehicle wheel hubs, especially for bicycles and similar vehicles, and the object of the invention is so to mount the hub shell on the wheel axle that it will yield under shocks or vibrations of the vehicle running on uneven road and thus prevent the vehicle and the driver from being influenced therefrom, but is able to support the total load. Another object of the invention is to make the appliance light in weight, strong in construction and cheap in price.

These objects are attained by making a known U-shaped bearing member, on which the hub is rotatably mounted and which eccentrically swings about the wheel axle, of a rigid member consisting of a light metal or alloy and placing the axle and the supporting spring within a central recess of the said member.

Further objects will be developed in the following specification and drawings and claimed in the concluding claims.

Two constructional embodiments of the invention have been represented in the annexed drawings, which form a part of this specification and in which—

Like numerals denote like parts throughout all figures of the drawings.

Figure 1:
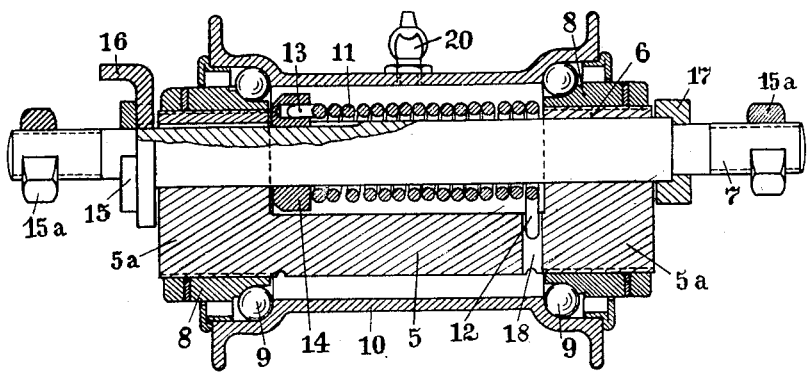
Fig. 1 is an axial sectional elevation of the wheel hub.

The springy or resilient mounting of the wheel hub 10 which is preferably adapted for the front wheel of a bicycle or like vehicles is attained by the hub shell being rotatably mounted on a separate and intermediate bearing body 5 which is eccentrically mounted on the wheel axle 7 fastened to the vehicle frame. The intermediate bearing body is therefore allowed to swing about said axle while a spring 11 inserted between the bearing body and the axle tends to bring the parts back into their normal position.

The bearing body 5 is made in one piece and recessed in its central portion. Disc-shaped end portions 5a of the body 5 are arranged on either side of the central recess and provided with eccentrical bores 6 in which is inserted the axle 7 clamped in the fork of the vehicle in the usual manner. Upon the end discs 5a of the bearing body are fastened the cones 8 for the ball bearings 9 on which the wheel hub 10 can rotate. By reason of the recess in the central portion of the body 5, this central portion is substantially U-shaped in cross-section.

Within the recess of the central portion of the bearing body 5, the axle 7 is surrounded by a helical spring 11 one end 12 of which engages with a radial bore 18 of the body 5 while the other end 13 engages with an axial bore of a ring 14 fastened to the axle 7 so as to be prevented from revolving thereon. In the embodiment shown by Fig. 1 of the drawings the ring is prevented from revolving on the axle by slot and key. An initial tension possibly necessary is imparted to the spring by the axle being turned in the bores 6 while being clamped in the fork by means of the usual fastening parts 15, 16, 17 and nuts 15a.

The bearing body 5, 5a is preferably made of a light metal e. g. aluminium or alloys of aluminium with other metals in order that the weight thereof is reduced. In spite of the recesses provided in the end discs 5a taking up the load, the whole is sufficiently resistant as the bearing cones 8 made of steel and enclosing these portions increase the strength of the whole set.

The spring hub works as follows. As a rule the hub occupies the position shown in Fig. 2 in which the center line of the bearing body is vertically beneath the center line of the axle. Under the action of the load the bearing body 5, 5a will however undergo a slight angular displacement about the axle 7 whereby the spring 11 will be given a corresponding tension. Thus in the case of vertical as well as horizontal shocks the bearing body will swing about the axle in a corresponding degree. The spring 11 permits this movement in either direction of rotation and regularly re-establishes the initial position. Generally, the axle of the fore wheel driven by the pull of the vehicle on route will advance with respect to the bearing body and therefore descend in front of same in a certain degree which will enable the springy play of the wheel up and down.

Figure 2:
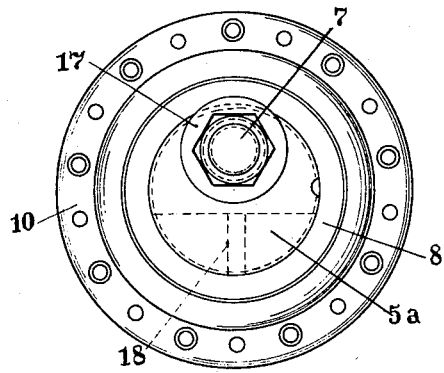
Fig. 2 shows the end view of the hub in accordance with Fig. 1.
Figure 3:
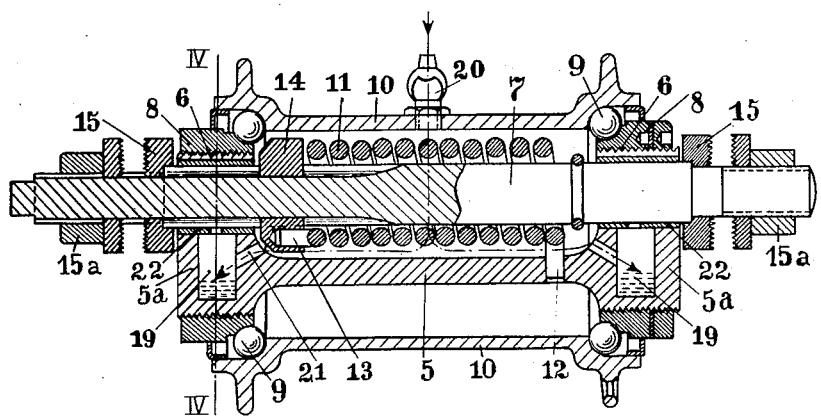
Fig. 3 illustrates an axial section of a modification of the hub.
Figure 4:
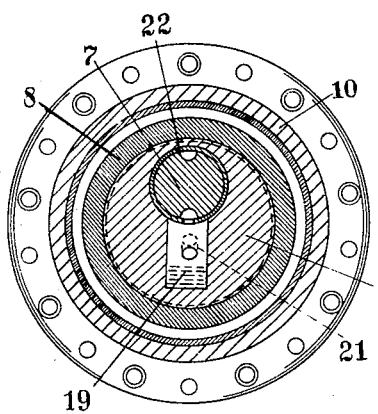
Fig. 4 represents a vertical cross section of the hub on the line IV—IV of Fig. 3.
Figure 5:
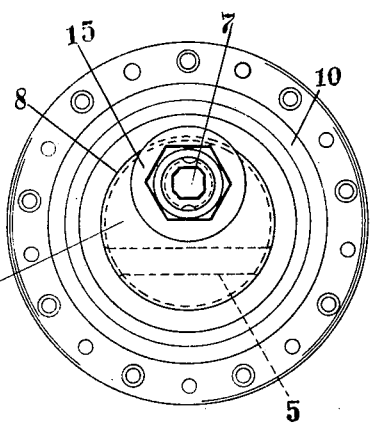
Fig. 5 is the end view of the hub shown in Fig. 3.

Referring to the construction illustrated in Figs. 3 to 5, the main parts are the same as described in connection with Figs. 1 and 2, except that the bracket 16 is eliminated and two corrugated washers 15 are employed to immobilize the axle in the fork.

Moreover, a lubricating device is incorporated with the bearing body by the arrangement of recesses 19 in the portions generally downwards directed of the end discs 5a, which recesses are designed to form oil-wells while bushes 22 for the axle are immovably fastened in the bores 6 and communicate with the oil-wells 19 through small perforations in their lower portion. Other passages 21 are provided to connect the central recess of the part 5 with the oil-wells 19. The oil poured by the oil-cap 20 into the central recess of the bearing body 5 also flows through the ducts 21 in the direction of the arrows shown in Fig. 3 into the reservoirs 19 from which it will be distributed on the several bearings 9 and 22 of the wheel hub.

What I claim, is—

1. In a springy wheel hub, the combination with a hub shell, of a wheel axle, an integral intermediate bearing body eccentrically rotatably placed on the said wheel axle and having bearings for the hub shell, said bearing body being recessed in its center portion so as to be U-shaped in section, and a spring arranged to interconnect the wheel axle and the bearing body and capable of restoring the normal relative position of all parts of the springy wheel hub.

2. In a springy wheel hub, the combination with a hub shell, of a wheel axle, an intermediate integral bearing body for the hub shell eccentrically mounted on the wheel axle, a ring member non-revolubly fixed on the wheel axle, and a spring engaging respectively the said ring member and the bearing body and adapted to bring the bearing body back into its normal position, the wheel axle, the ring member and the spring being received in a lateral recess of the center portion of the bearing body.

3. In a springy wheel hub, the combination with a hub shell, of a wheel axle, an intermediate integral bearing body rotatable on the wheel axle, the said bearing body being recessed laterally in its central portion, so as to be formed of an axial middle portion and end discs having eccentrical bores for receiving the wheel axle, a spring adapted to bring the bearing body back into its normal position, and oil-wells provided in said end discs.

FRANZ WINKLER.